(12) United States Patent
Iwane

(10) Patent No.: US 10,499,027 B2
(45) Date of Patent: Dec. 3, 2019

(54) PROCESSOR DEVICE AND METHOD OF OPERATING THE SAME

(71) Applicant: FUJIFILM Corporation, Tokyo (JP)

(72) Inventor: Kosuke Iwane, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/015,214

(22) Filed: Jun. 22, 2018

(65) Prior Publication Data

US 2018/0376119 A1    Dec. 27, 2018

(30) Foreign Application Priority Data

Jun. 23, 2017 (JP) ................................ 2017-122779

(51) Int. Cl.
| | | |
|---|---|---|
| H04N 13/00 | (2018.01) | |
| A61B 1/04 | (2006.01) | |
| A62B 1/04 | (2006.01) | |
| H04N 9/73 | (2006.01) | |
| H04N 7/18 | (2006.01) | |
| H04N 5/228 | (2006.01) | |
| H04N 5/225 | (2006.01) | |

(52) U.S. Cl.
CPC ........... H04N 9/735 (2013.01); H04N 5/2256 (2013.01); H04N 2005/2255 (2013.01)

(58) Field of Classification Search
USPC ................ 348/45, 65, 61, 223.1, 225.1, 655
See application file for complete search history.

(56) References Cited

U.S. PATENT DOCUMENTS

| | | | |
|---|---|---|---|
| 6,669,628 B2 | 12/2003 | Abe | |
| 2012/0215066 A1* | 8/2012 | Akiyama | A61B 1/00009 600/109 |
| 2015/0071564 A1* | 3/2015 | Sasaki | H04N 5/3675 382/275 |
| 2015/0245002 A1* | 8/2015 | Kuramoto | H04N 9/646 348/70 |

FOREIGN PATENT DOCUMENTS

JP        2002248077        9/2002

* cited by examiner

*Primary Examiner* — Daquan Zhao
(74) *Attorney, Agent, or Firm* — JCIPRNET

(57) ABSTRACT

Provided are a processor device capable of correcting white balance without applying a burden to a user in a case where an endoscope that is not suitable for a light source device or a processor device is connected, and a method of operating the same.

A correction coefficient acquisition unit acquires a correction coefficient from endoscopes. The white balance control unit selects and executes either first white balance processing in which an acquired correction coefficient is referred to, and white balance is corrected using the acquired correction coefficient, or second white balance processing in which the white balance is corrected using a first multiplied correction coefficient obtained by multiplying the acquired correction coefficient by a first conversion coefficient.

8 Claims, 7 Drawing Sheets

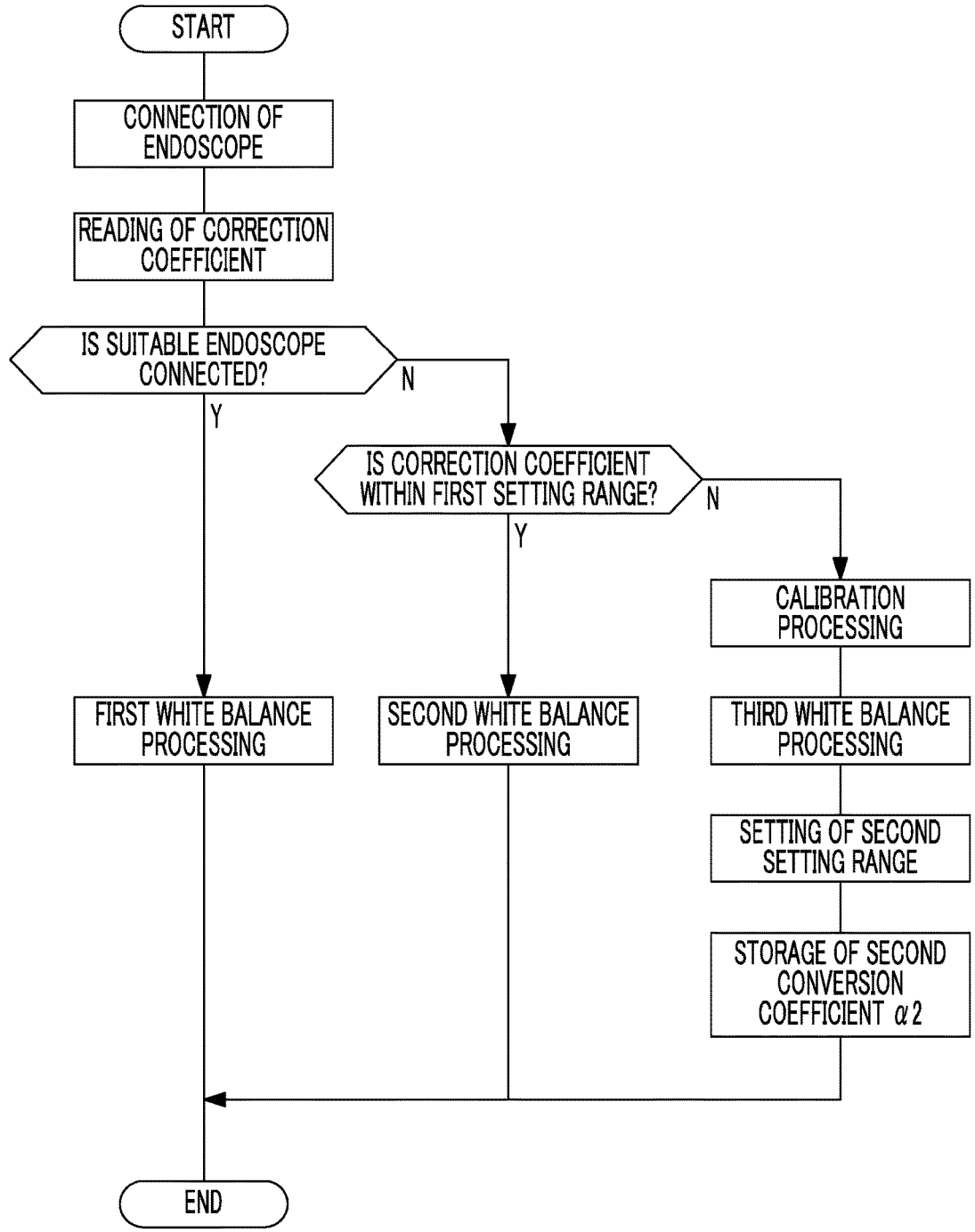

PROCESSOR DEVICE AND METHOD OF OPERATING THE SAME

CROSS-REFERENCE TO RELATED APPLICATION

This application claims priority under 35 USC 119 from Japanese Patent Application No. 2017-122779, filed 23 Jun. 2017, the disclosure of which is incorporated by reference herein.

BACKGROUND OF THE INVENTION

1. Field of the Invention

The present invention relates to a processor device that corrects the white balance of color images obtained by imaging of an observation object, and a method of operating the same.

2. Description of the Related Art

In the medical field, endoscope systems including a light source device, an endoscope, and a processor device have become widespread. In the endoscope systems, an observation object is illuminated with illumination light emitted from a light source device via an endoscope. The endoscope acquires images of the observation object by imaging the observation object illuminated with the illumination light using an imaging element. The acquired images of the observation object are subjected to various kinds of image processing in a processor device. The images of the observation object subjected to the various kinds of image processing are output and displayed on a monitor.

Regarding the light source provided at the light source device, the imaging element provided at the endoscope, or the like as described above, an individual difference may occur in a manufacturing process. Such an individual difference of the light source device or the endoscope will affect the quality, especially, the white balance of the images of the observation object. Thus, in the endoscope, a correction coefficient for correcting a deviation of the white balance caused by the individual difference of the light source device or the endoscope is stored. In a case where the endoscope is connected to the light source device and the processor device, the deviation of the white balance is corrected by reading a correction coefficient from the endoscope and multiplying the images of the observation object by the read correction coefficient.

The correction coefficient to be used for the correction of the white balance is effective in a case where an endoscope that is suitable for the light source device or the processor device is connected, such as in a case where the endoscope is connected to the light source device or the processor device of the same model as the endoscope. For that reason, for example, in a case where an endoscope that is not suitable for the light source device or the processor device is connected, such as in a case where the endoscope is connected to the light source device or the processor device of a different model from the endoscope, the white balance cannot be accurately corrected with the correction coefficient stored in the endoscope.

Thus, in JP2002-248077A (corresponding to U.S. Pat. No. 6,669,628B), the correction coefficient stored in the endoscope is referred to in a case where the endoscope is connected to the light source device or the processor device, and calibration processing in which a white subject is imaged and a correction coefficient is newly calculated is performed in a case where the endoscope that is not suitable for the light source device or the processor device is connected. By using such a correction coefficient, the white balance can be accurately corrected even in a case where the endoscope and the light source device or the processor device are different models, respectively.

SUMMARY OF THE INVENTION

Here, in a case where the characteristics of the light source device or the processor device are not so much different from the characteristics of the light source device or the processor device of the model corresponding to the endoscope even in a case where the endoscope and the light source device or the processor device are different models, respectively, the deviation of the white balance will not change so much, either. Even in this case, as in JP2002-248077A, imaging the white subject to newly calculate the correction coefficient through the calibration processing will place a burden on the user.

An object of the invention is to provide a processor device capable of correcting white balance without placing a burden to a user in a case where an endoscope that is not suitable for a light source device or a processor device is connected, and a method of operating the same.

The invention provides a processor device to which an endoscope that stores a correction coefficient for correcting a white balance of color images obtained by imaging an observation object is connected and which corrects the white balance on the color images acquired from the endoscope. The processor device comprises a correction coefficient acquisition unit that acquires the correction coefficient from the endoscope; and a white balance control unit that performs a control in which either first white balance processing in which the acquired correction coefficient that is the correction coefficient acquired by the correction coefficient acquisition unit is referred to and the white balance is corrected using the acquired correction coefficient, or second white balance processing in which the white balance is corrected using a first multiplied correction coefficient obtained by multiplying the acquired correction coefficient by a preset first conversion coefficient is selected and executed.

It is preferable that the white balance control unit selects and executes the first white balance processing in a case where combination with the endoscope is determined to be suitable with reference to the acquired correction coefficient, and selects and executes the second white balance processing in a case where the combination with the endoscope is determined not to be suitable with reference to the acquired correction coefficient and the acquired correction coefficient falls within a first setting range that allows the correction of the white balance with the first conversion coefficient.

It is preferable that the white balance control unit executes calibration processing in which a second conversion coefficient different from the first conversion coefficient is newly calculated and executes third white balance processing in which the white balance is corrected using a second multiplied correction coefficient obtained by multiplying the acquired correction coefficient by the second conversion coefficient, in a case where combination with the endoscope is determined not to be suitable with reference to the acquired correction coefficient and the acquired correction coefficient does not fall within a first setting range that allows the correction of the white balance with the first conversion coefficient. It is preferable that, in the calibration processing, the second conversion coefficient is calculated on the basis of a white image obtained by imaging a standard white plate with the endoscope. It is preferable that, in the calibration processing, a ratio of a white image correcting coefficient calculated as the correction coefficient from the white image and the acquired correction coefficient is calculated as the second conversion coefficient.

It is preferable that the processor device further comprises a range setting unit that sets a second setting range that allows the correction of the white balance using the second conversion coefficient; and a conversion coefficient storage unit that stores the second setting range and the second conversion coefficient in association with each other, and the white balance control unit executes the third white balance processing in a case where the combination with the endoscope is determined not to be suitable with reference to the acquired correction coefficient and the acquired correction coefficient falls within the second setting range.

It is preferable that the color images are an R image, a G image, and a B image, and the correction coefficient is two gain coefficients among an R gain coefficient, a G gain coefficient, and a B gain coefficient by which the R image, the G image, and the B image are multiplied, respectively. It is preferable that the color images are an R image, a G image, and a B image, and the correction coefficient is two gain coefficients among an R gain coefficient, a G gain coefficient, and a B gain coefficient by which the R image, the G image, and the B image are multiplied, respectively, and the first setting range is a range that is determined from two gain coefficients among the R gain coefficient, the G gain coefficient, and the B gain coefficient.

The invention provides a method of operating a processor device to which an endoscope that stores a correction coefficient for correcting a white balance of color images obtained by imaging an observation object is connected and which corrects the white balance on the color images acquired from the endoscope. The method comprises a correction coefficient acquisition step of acquiring the correction coefficient from the endoscope with a correction coefficient acquisition step; and a white balance control step of performing a control in which a white balance control unit select and execute either first white balance processing in which the acquired correction coefficient that is the correction coefficient acquired by the correction coefficient acquisition unit is referred to and the white balance is corrected using the acquired correction coefficient, or second white balance processing in which the white balance is corrected using a first multiplied correction coefficient obtained by multiplying the acquired correction coefficient by a preset first conversion coefficient.

It is preferable that the white balance control step includes: a step of selecting and executing the first white balance processing in a case where combination with the endoscope is determined to be suitable with reference to the acquired correction coefficient, and selecting and executing the second white balance processing in a case where the combination with the endoscope is determined not to be suitable with reference to the acquired correction coefficient and the acquired correction coefficient falls within a first setting range that allows the correction of the white balance with the first conversion coefficient.

According to the invention, the white balance can be corrected without applying a burden to a user even in a case where an endoscope that is not suitable for a light source device or a processor device is connected.

BRIEF DESCRIPTION OF THE DRAWINGS

FIG. 7 is a flowchart illustrating a flow of a white balance setting method performed in a case where the endoscope is connected.

DESCRIPTION OF THE PREFERRED EMBODIMENTS

Figure 1:
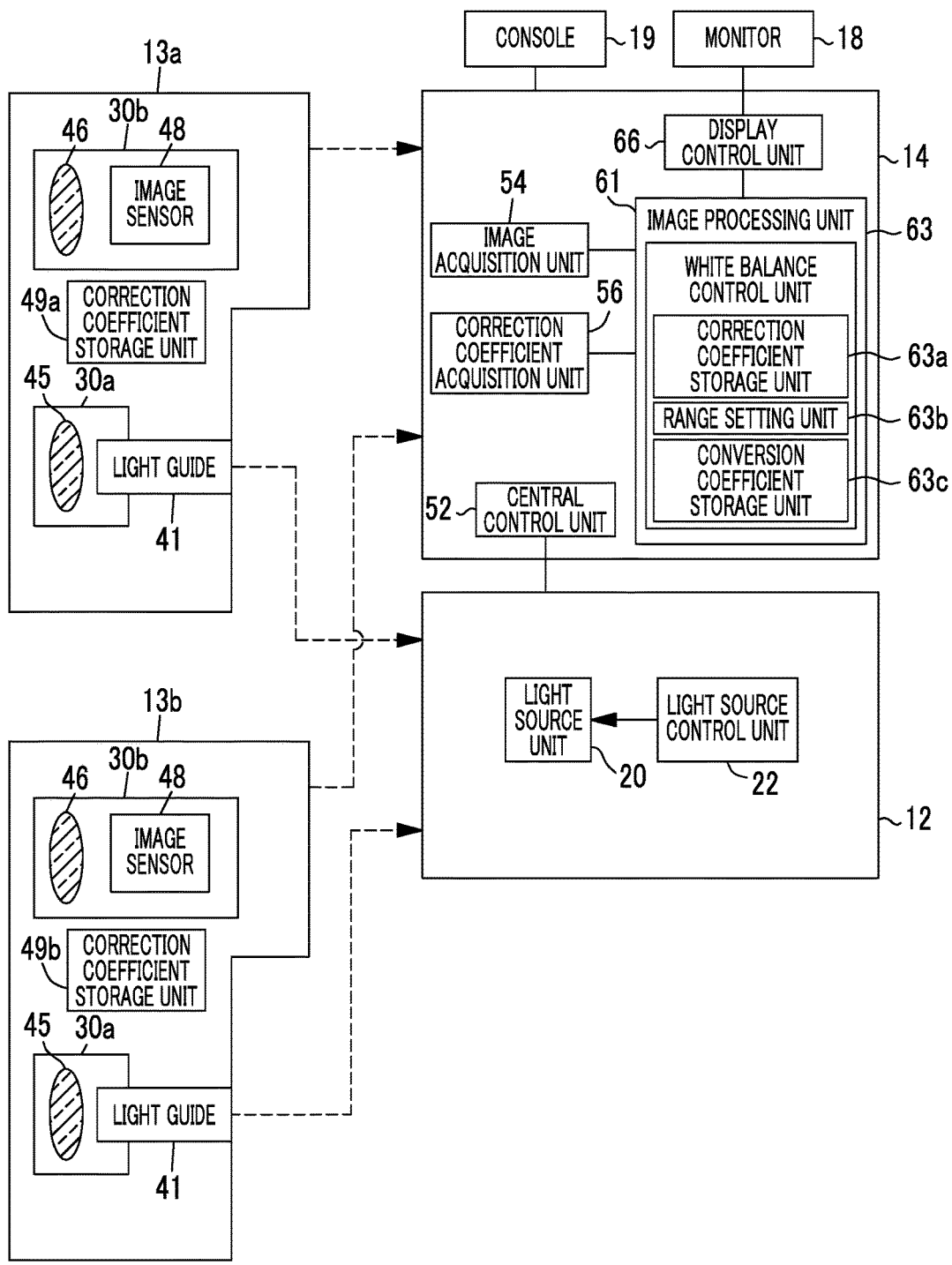
FIG. 1 is a block diagram of an endoscope system.

As illustrated in FIG. 1, an endoscope system 10 includes a light source device 12 and a processor device 14. Additionally, in the endoscope system 10, an endoscope 13a of the same type as the light source device 12 or the processor device 14 is connected to the light source device 12 or the processor device 14, and also an endoscope 13b of a different type from the light source device 12 or the processor device 14 is connected thereto.

The light source device 12 generates illumination light with respect to an observation object. The processor device 14 performs system control, image processing, and the like of the endoscope system 10. The endoscopes 13a and 13b illuminated the observation object with the illumination light and image the observation object illuminated with the illumination light. Images of the observation object obtained by the endoscopes 13a and 13b are sent to the processor device 14. The images of the observation object subjected to the image processing or the like in the processor device 14 is displayed on the monitor 18. In addition, setting input or the like to the processor device 14 or the like are performed by a console 19.

The light source device 12 includes a light source unit 20 that emits the illumination light, and a light source control unit 22 that controls driving of the light source unit 20. The light source unit 20 includes, for example, a plurality of light emitting diodes (LEDs) that emit light beams having different central wavelengths or wavelength ranges, as light sources. A plurality of kinds of illumination light beams having different wavelengths can be emitted depending on light emission or turn-on of the individual LEDs, adjustment of light quantity, or the like.

For example, the light source unit 20 is capable of emitting broadband purple light, blue light, green light, and red light having relatively wide wavelength ranges as the illumination light beams, respectively. Particularly, the light source unit 20 is capable of emitting narrowband (meaning that the wavelength ranges are ranges of about 10 nm to 20 nm) purple light, blue light, green light, and red light as the illumination light beams, in addition to the broadband purple light, blue light, green light, and red light. Additionally, the light source unit 20 is capable of emitting narrowband purple light of which the central wavelength is about 400 nm, first narrowband blue light of which the central wavelength is about 450 nm, second narrowband blue light of which the central wavelength is about 470 nm, narrowband green light of which the central wavelength is about 540 nm, and narrowband red light of which the central wavelength is about 640 nm, as the illumination light beams. In addition, the light source unit 20 can emit white light as an illumination light beam by combining the broadband or narrowband purple light, blue light, green light, and red light with each other. In addition, red light may be eliminated, and the white light may be emitted by three color light beams of purple light, blue light, and green light.

In addition, instead of such LEDs, a combination of a laser diode (LD), a fluorescent body, and a band limiting filter, a combination of a lamp, such as a xenon lamp, and a band limiting filter, or the like can be used for the light source unit 20. It is natural that, even in a case where the LEDs constitute the light source unit 20, the fluorescent body or the band limiting filter can be used in combination with the LEDs.

The light source control unit 22 independently controls the timing of turning on/off the individual light sources that constitute the light source unit 20, the light emission amount thereof at the time of the turn-on, and the like. As a result, the light source unit 20 is capable of emitting the plurality of kinds of illumination light beams having different wavelengths. Additionally, the light source control unit 22 controls the light source unit 20 in conformity with timing (so-called frame) for imaging of an image sensor 48.

The endoscope 13a includes a light guide 41 that guides the illumination light emitted by the light source unit 20. The light guide 41 propagates the illumination light up to a distal end part of the endoscope 13a. In addition, multimode fiber can be used as the light guide 41. As an example, a fine-diameter fiber cable of which the core diameter is 105 μm, the clad diameter is 125 μm, and a diameter including a protective layer used as an outer cover is φ0.3 to 0.5 mm can be used.

A distal end part of the endoscope 13a is provided with an illumination optical system 30a and an imaging optical system 30b. The illumination optical system 30a has an illumination lens 45 and emits the illumination light toward the observation object via the illumination lens 45. The imaging optical system 30b has an objective lens 46 and an image sensor 48. The image sensor 48 images the observation object using reflected light or the like (including scattered light, fluorescence emitted from the observation object, fluorescence due to medicine administered to the observation object, or the like other than the reflected light) of the illumination light returning from the observation object via the objective lens 46. In addition, a zoom lens that magnifies or reduces the observation object may be provided between the objective lens 46 and the image sensor 48.

The image sensor 48 is, for example, a color sensor having color filters of a primary color system, and includes three types of pixels of a B pixel (blue pixel) having a blue color filter, a G pixel (green pixel) having a green color filter, and am R pixel (red pixel) having a red color filter. The blue color filter allows mainly purple to blue light to be transmitted therethrough. The green color filter allows mainly green light to be transmitted therethrough. The red color filter allows mainly red light to be transmitted therethrough. By imaging the observation object of the primary color system using the image sensor 48 as described above, three color images including a B image (blue image) obtained from the B pixel, a G image (green image) obtained from the G pixel, and an R image (red image) obtained from the R pixel can be simultaneously obtained.

In addition, as the image sensor 48, a charge coupled device (CCD) image sensor or a complementary metal-oxide semiconductor (CMOS) image sensor is available. Additionally, although the image sensor 48 of the present embodiment is the color sensor of the primary color system, a color sensor of a complementary color system can also be used. The color sensor of the complementary color system has, for example, a cyan pixel provided with a cyan color filter, a magenta pixel provided with a magenta color filter, a yellow pixel provided with a yellow color filter, and a green pixel provided with a green color filter. Images obtained from the above individual color pixels in a case where the color sensor of the complementary color system is used can be converted into the B image, the G image, and the R image in a case where complementary color-primary color conversion is performed. Additionally, instead of the color sensor, a monochrome sensor that is not provided with the color filters can be used as the image sensor 48. In this case, the above individual color images can be obtained by sequentially imaging the observation object using the individual illumination light beams in colors, such as BGR.

The endoscope 13a is provided with a correction coefficient storage unit 49a that stores a correction coefficient Kx for correcting the white balance of the color images. A deviation of the white balance caused by an individual difference of the endoscope 13a or an individual difference of the light source device 12 of the same model as the endoscope 13a can be corrected by the correction coefficient Kx. As the individual difference of the endoscope 13a, for example, there is a variation in the optical property of the light guide 41, a variation in the spectral sensitivity of the image sensor 48, or the like. As the individual difference of the light source device 12, for example, there is a variation in the spectral radiation intensity of the illumination light emitted from the light source unit 20, or the like. In addition, in order to determine whether or not the endoscope 13a suitable for the light source device 12 or the processor device 14 is connected, the correction coefficient Kx is stored also in a correction coefficient storage unit 63a of a white balance control unit 63 of the processor device 14 to be described below.

For example, an R gain coefficient Grx by which the R image of the color images is multiplied and a B gain coefficient Gbx by which the B image of the color images is multiplied are used as the correction coefficient Kx. In addition, it is preferable that the correction coefficient Kx is a combination of the R gain coefficient Grx and the B gain coefficient Gbx. Instead of this, however, a combination of a G gain coefficient Ggx and the R gain coefficient Grx by which the G image of the color images is multiplied, or a combination of the B gain coefficient Gbx and the G gain coefficient Ggx may be adopted. The same applies to a correction coefficient Ky to be described below.

The endoscope 13b has substantially the same configuration as the endoscope 13a. However, since the endoscope 13b is different from the endoscope 13a in model, there is a case where the characteristics of the individual parts are different from each other. Additionally, the endoscope 13b is also provided with a correction coefficient storage unit 49b that stores the correction coefficient Ky for correcting the white balance of the color images. A deviation of the white balance caused by the individual difference of the endoscope 13b or an individual difference of the light source device 12 of the same model as the endoscope 13b can be corrected by the correction coefficient Ky. An R gain coefficient Gry by which the R image of the color images is multiplied and a B gain coefficient Gby by which the B image of the color images is multiplied are used as the correction coefficient Ky.

The processor device 14 has a central control unit 52, an image acquisition unit 54, a correction coefficient acquisition unit 56, an image processing unit 61, and a display control unit 66. The central control unit 52 performs overall control of the endoscope system 10, such as synchronous control between illumination light radiation timing and imaging timing. Additionally, in a case where input of various settings or the like is performed using the console 19 or the like, the central control unit 52 inputs the settings to the respective units of the endoscope system 10, such as the light source control unit 22, the image sensor 48, or the image processing unit 61.

The image acquisition unit 54 acquires color images from the image sensor 48. The correction coefficient acquisition unit 56 acquires a correction coefficient from the endoscope 13a or the endoscope 13b. The correction coefficient acquired by the correction coefficient acquisition unit 56 is referred to as an acquired correction coefficient. The color images acquired by the image acquisition unit 54 and the acquired correction coefficient are sent to the image processing unit 61.

The image processing unit 61 performs various kinds of image processing on the color images. In the present embodiment, the image processing unit 61 includes the white balance control unit 63 that performs correction or the like of the white balance of the color images. The details of the white balance control unit 63 will be described below. The color images subjected to various kinds of image processing in the image processing unit 61 are sent to the display control unit 66. The display control unit 66 performs the control of displaying the color images on the monitor 18.

In addition, in the image processing unit 61, it is preferable to perform various kinds of processing, such as defect correction processing, offset processing, gain correction processing, linear matrix processing, gamma conversion processing, demosaicing processing, YC conversion processing, and noise reduction processing, as needed, other than the correction of the white balance.

The defect correction processing is the processing of correcting the pixel value of a pixel corresponding to a defective pixel of the image sensor 48. The offset processing is the processing of reducing a dark current component from the images subjected to the defect correction processing, and setting an accurate zero level. The linear matrix processing is the processing of enhancing color reproducibility on the images subjected to the offset processing, and the gamma conversion processing is the processing of adjusting the brightness or saturation of the image after the linear matrix processing. The demosaicing processing (also referred to as equalization processing or synchronization processing) is the processing of interpolating the pixel value of a missing pixel, and is performed on the images after the gamma conversion processing. The missing pixel is a pixel with no pixel value (because other color pixels are disposed in the image sensor 48) due to the arrangement of the color filters.

For example, since the B image is an image obtained by imaging the observation object in the B pixel, there is no pixel value in pixels at positions corresponding to the G pixel and the R pixel of the image sensor 48. In the demosaicing processing, the pixel values of the pixels at the positions of the G pixel and the R pixel of the image sensor 48 are generated by interpolating the B image. The YC conversion processing is the processing of converting the image after the demosaicing processing into a luminance channel Y, a color difference channel Cb, and a color difference channel Cr.

The noise reduction processing is noise reduction processing performed using, for example, a moving average method, a median filter method, or the like, on the luminance channel Y, the color difference channel Cb, and the color difference channel Cr. In addition, the luminance channel Y, the color difference channel Cb, and the color difference channel Cr after the noise reduction processing are re-converted into images in respective colors of BGR.

The white balance control unit 63 performs selection of at least either first white balance processing in which the acquired correction coefficient is referred to and the white balance of the color images is corrected using the acquired correction coefficient, or second white balance processing in which the white balance of the color images is corrected using a first multiplied correction coefficient obtained by multiplying the acquired correction coefficient by a first conversion coefficient α1. In addition, the first conversion coefficient α1 is stored in advance in a conversion coefficient storage unit 63c.

Figure 2:
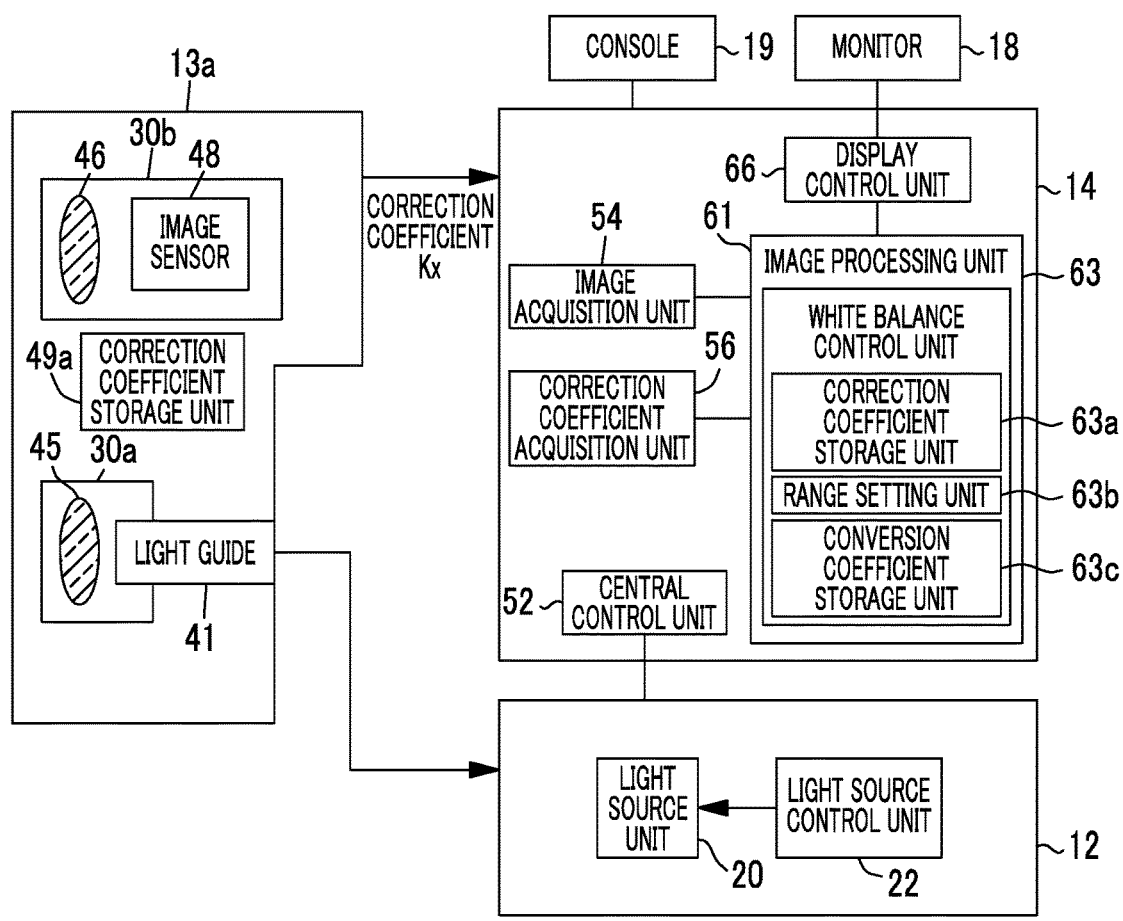
FIG. 2 is a block diagram of an endoscope system in a case where an endoscope suitable for a light source device or a processor device is connected.

As illustrated in FIG. 2, in a case where the endoscope 13a is connected to the light source device 12 or the processor device 14, the correction coefficient Kx is acquired as the acquired correction coefficient from the endoscope 13a. Since the correction coefficient Kx coincides with the correction coefficient Kx stored in the correction coefficient storage unit 63a on the processor device 14 side, the endoscope 13a suitable for light source device 12 or the processor device 14 is determined to be connected (the combination with the endoscope is suitable). In this case, the white balance control unit 63 performs execution by selecting the first white balance processing. In the first white balance processing, the R gain coefficient Grx and the B gain coefficient Gbx that are the correction coefficient Kx are used. Then, the R image and the B image of the color images are respectively multiplied by the R gain coefficient Grx and the B gain coefficient Gbx. Accordingly, the first white balance processing is completed.

Figure 3:
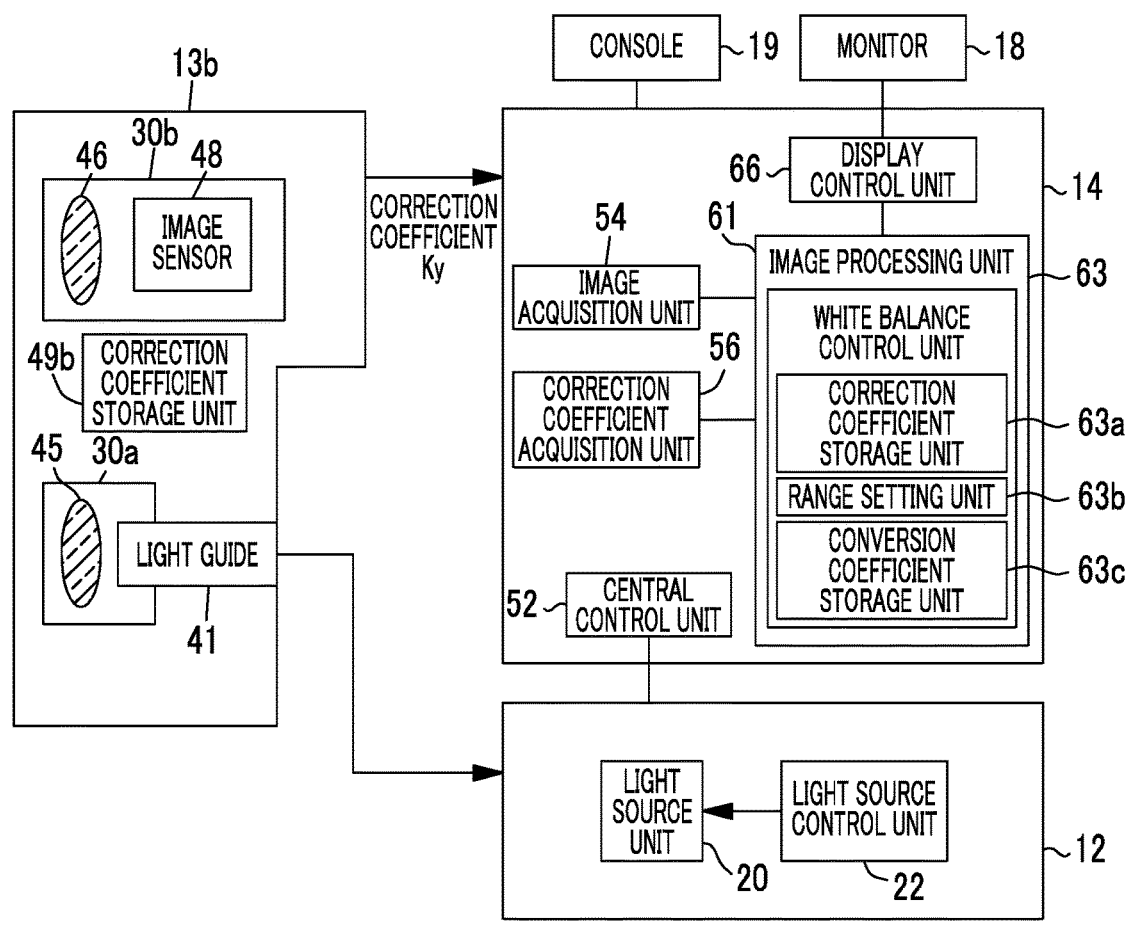
FIG. 3 is a block diagram of an endoscope system in a case where an endoscope that is not suitable for the light source device or the processor device is connected.

Meanwhile, as illustrated in FIG. 3, in a case where the endoscope 13b is connected to the light source device 12 or the processor device 14, the correction coefficient Ky is acquired as the acquired correction coefficient from the endoscope 13b. Since the correction coefficient Ky does not coincide with the correction coefficient Kx stored in the correction coefficient storage unit 63a on the processor device 14 side, the endoscope 13b that is not suitable for light source device 12 or the processor device 14 is determined to be connected (the combination with the endoscope is not suitable). In this case, the white balance control unit 63 performs execution by selecting the second white balance processing using a first multiplied correction coefficient "α1×Ky" obtained by multiplying the correction coefficient Ky by the first conversion coefficient α1 in a case where the correction coefficient Ky falls within the first setting range. Here, the first setting range means a range that allows the correction of the white balance by converting the acquired correction coefficient with the first conversion coefficient α1 made to respond to the characteristics of the light source device 12 or the processor device 14 even in a case where the endoscope 13b that is not suitable for the light source device 12 or the processor device 14 is connected.

Figure 4:
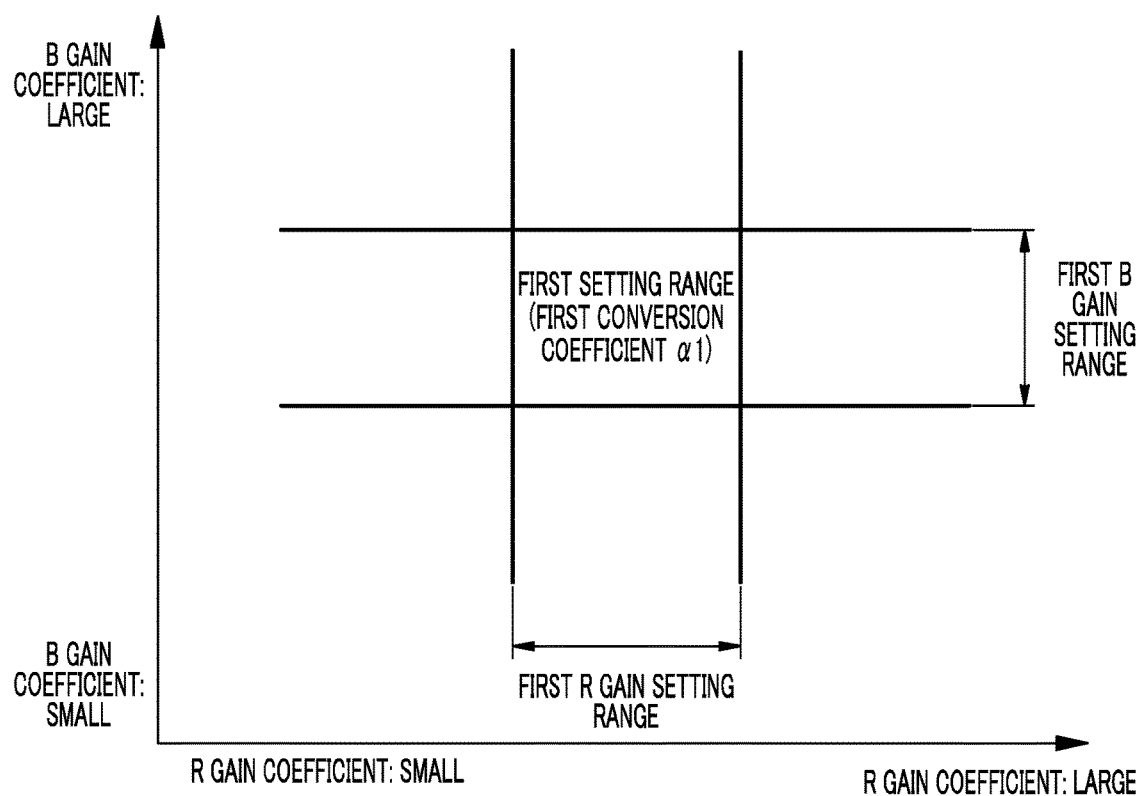
FIG. 4 is an illustrative view illustrating a first setting range.

For example, as illustrated in FIG. 4, the first setting range includes a first R gain setting range and a first B gain setting range, and the correction coefficient Ky falls into the first setting range in a case where the R gain coefficient Gry falls within the first R gain setting range in the correction coefficient Ky that is the acquired correction coefficient, and the B gain coefficient Gby falls within the first B gain setting range. In addition, in FIG. 4, a horizontal axis represents the R gain coefficient Gry, and the R gain coefficient Gry becomes larger toward the right side. Additionally, a vertical axis represents the B gain coefficient Gby, and the B gain coefficient Gby becomes larger toward the upper side. This is also the same in the FIG. 6.

In the second white balance processing, the R image is multiplied by an R gain coefficient (α1×Gry) obtained by the first conversion coefficient α1 as the first multiplied correction coefficient. Similarly, the B image is multiplied by a B gain coefficient (α1×Gby) obtained by multiplying the first conversion coefficient α1 as the first multiplied correction coefficient. Accordingly, the second white balance processing is completed. As described above, the correction of the white balance is allowed without performing calibration processing (to be described below) by using the first conversion coefficient α1 even in a case where the endoscope 13b that is not suitable for the light source device 12 or the processor device 14 is connected. In addition, as the first conversion coefficient α1, not a coefficient common to the R gain coefficient Grx and the B gain coefficient Gbx, but separate coefficients for the R gain coefficient Grx and the B gain coefficient Gbx may be used.

Additionally, in a case where it is determined that the endoscope 13b that is not suitable for the light source device 12 or the processor device 14 is connected (the combination with the endoscope is not suitable) and the correction coefficient Ky does not fall within the first setting range, the white balance cannot be accurately corrected with the first conversion coefficient α1. Thus, the white balance control unit 63 performs the calibration processing in which a second conversion coefficient α2 is newly calculated so that the white balance can be accurately corrected using the correction coefficient Ky.

Figure 5:
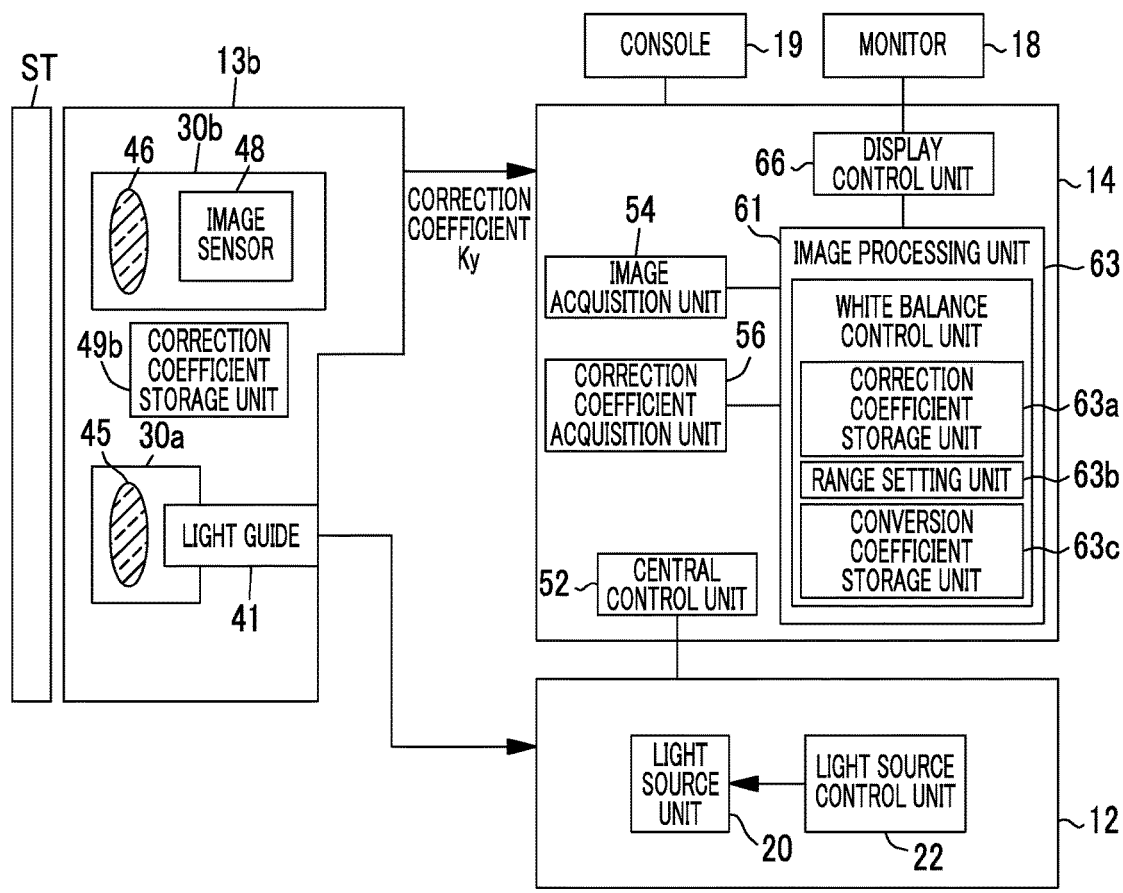
FIG. 5 is a block diagram of an endoscope system in a case where calibration processing is performed using a standard white plate ST.

In the calibration processing, as illustrated in FIG. 5, the second conversion coefficient α2 is calculated using a white image obtained by imaging the standard white plate ST with the endoscope 13b. For example, a white image correcting coefficient for correcting the white balance is calculated from the white image. The white image correcting coefficient includes, for example, an R gain coefficient Grw and a B gain coefficient Gbw. The second conversion coefficient α2 is calculated from a ratio (Grw/Gry) of the R gain coefficient Gry of the correction coefficient Ky and the R gain coefficient Grw that is the white image correcting coefficient.

In addition, the second conversion coefficient α2 may be calculated from a ratio (Gbw/Gby) of the B gain coefficient Gby of the correction coefficient Ky and Gbw that is the white image correcting coefficient. Additionally, as the second conversion coefficient α2, not a coefficient common to the R gain coefficient Gry and the B gain coefficient Gby, but separate coefficients for the R gain coefficient Gry and the B gain coefficient Gby may be used.

After the calculation of the second conversion coefficient α2, the white balance control unit 63 performs third white balance processing in which the white balance of the color images is corrected using a second multiplied correction coefficient "α2×Ky" obtained by multiplying the correction coefficient Ky by the second conversion coefficient α2. Additionally, the white balance control unit 63 sets a second setting range, which allows the correction of the white balance with the second conversion coefficient α2, with reference to the magnitude of the correction coefficient Ky, using a range setting unit 63b. The set second setting range and second conversion coefficient α2 are matched with each other, and are stored in the conversion coefficient storage unit 63c.

Figure 6:
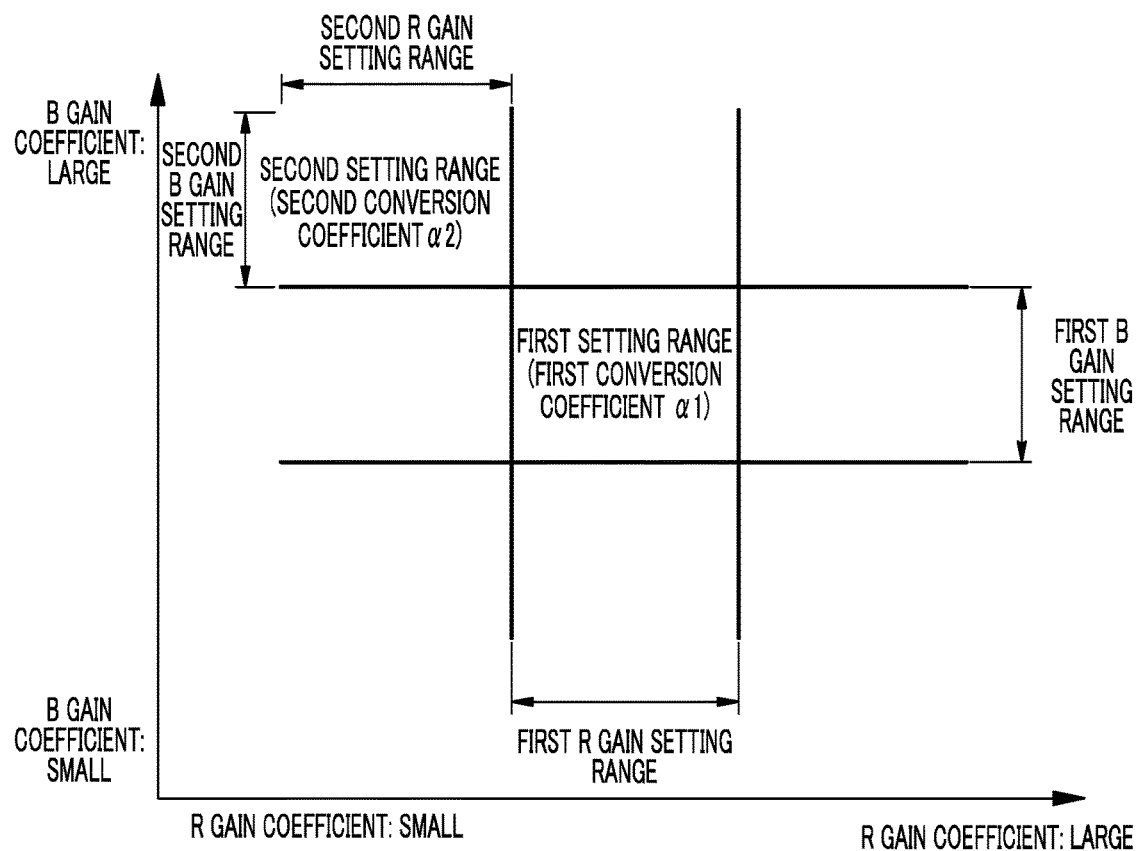
FIG. 6 is an illustrative view illustrating a second setting range.

For example, as illustrated in FIG. 6, in a case where the R gain coefficient Gry of the correction coefficient Ky is smaller than a lower limit value of the first R gain setting range and the B gain coefficient Gby is larger than an upper limit value of the first B gain setting range, the range setting unit 63b sets the second setting range different from the first setting range. In the second setting range, a second R gain setting range is determined in accordance with the magnitude of the R gain coefficient Gry, and a second B gain setting range is determined in accordance with the magnitude of the B gain coefficient Gby.

By providing the second setting range in this way, the second conversion coefficient α2 can be used as it is in a case where an endoscope that is different from the endoscope 13b in model, but has a correction coefficient similarly falling within the second setting range is connected to the light source device 12 or the processor device 14. Accordingly, the white balance can be simply corrected without performing the calibration processing. In addition, in the case as illustrated n FIG. 6, third to ninth setting ranges corresponding to third to ninth conversion coefficients α3 to α9 can be provided in addition to the second setting range. The calculation of the third to ninth conversion coefficients α3 to α9 and the setting of the third to ninth setting ranges are the same as the method of calculating the second conversion coefficient α2 and the method of setting the second setting range.

Next, a white balance setting method performed in a case where an endoscope is connected to the light source device 12 or the processor device 14 is explained along with the flowchart of FIG. 7. First, an endoscope is connected to the light source device 12 and the processor device 14. In a case where the endoscope is connected to the light source device 12 and the processor device 14, the correction coefficient acquisition unit 56 acquires a correction coefficient from the endoscope 13a or endoscope 13b. The white balance control unit 63 determines whether the connected endoscope is suitable for the light source device 12 or the processor device 14 with reference to the acquired correction coefficient that is the correction coefficient acquired by the correction coefficient acquisition unit 56.

In a case where the connected endoscope is the endoscope 13a, the acquired correction coefficient and the correction coefficient stored in the correction coefficient storage unit 63a on the processor device 14 side coincide with each other by "Kx". Therefore, the connected endoscope is determined to be suitable for the light source device 12 or the processor device 14 (combination with the endoscope is suitable). In this case, the first white balance processing is executed using the correction coefficient Kx.

On the other hand, in a case where the connected endoscope is the endoscope 13b, the acquired correction coefficient is "Ky", whereas the correction coefficient stored in the correction coefficient storage unit 63a on the processor device 14 side is "Kx", and both the correction coefficients do not coincide with each other. Therefore, the connected endoscope is determined not to be suitable for the light source device 12 or the processor device 14 (combination with the endoscope is not suitable). In this case, whether or not "Ky" that is the acquired correction coefficient falls within the first setting range is further determined. In a case where it is determined that the correction coefficient "Ky" falls within the first setting range, the second white balance processing is executed using the first multiplied correction coefficient "α1×Ky" obtained by multiplying the correction coefficient "Ky" by the first conversion coefficient α1.

In contrast, in a case where it is determined that the correction coefficient "Ky" does not fall within the first setting range, the standard white plate ST is imaged by the endoscope 13b, and a white image is acquired. The second conversion coefficient α2 is calculated by performing the calibration processing using this white image and the correction coefficient "Ky". In a case where the second conversion coefficient α2 is calculated, the third white balance processing is executed using the second multiplied correction coefficient "α2×Ky" obtained by multiplying the correction coefficient "Ky" by the second conversion coefficient α2. Additionally, the range setting unit 63b sets the second setting range with reference to the magnitude of the correction coefficient "Ky". In a case where the second setting range is set, the second setting range is matched with the second conversion coefficient α2 and is stored in the conversion coefficient storage unit 63c.

In the above embodiment, hardware structures of processing units, which execute various kinds of control and processing, such as the central control unit 52, the image acquisition unit 54, the correction coefficient acquisition unit 56, the image processing unit 61, the white balance control unit 63, the range setting unit 63b, the conversion coefficient storage unit 63c, and the display control unit 66, are various processors as shown below. Various processors include a central control unit (CPU) that is a general-purpose processor which executes software (programs) to function as various processing units, a programmable logic device (PLD) that is a processor capable of changing a circuit configuration after manufacture of a field programmable gate array (FPGA) or the like, an exclusive electric circuit that is a processor having a circuit configuration exclusively designed to execute various kinds of processing, and the like.

One processing unit may be constituted of one of these various processors, or may be constituted of a combination of two or more same or different types of processors (for example, a combination of a plurality of the FPGAs or a combination of the CPU and the FPGA). Additionally, the plurality of processing units may be constituted of one processor. As an example in which the plurality of processing units are constituted of the one processor, firstly, as represented by a computer, such as a client or a server, there is a form in which one processor is constituted of a combination of one or more CPUs and software and this processor functions as the plurality of processing units. Secondly, as represented by a system-on-chip (SOC) or the like, there is a form in which a processor, which realizes functions of an overall system including the plurality of processing units with one integrated circuit (IC) chip, is used. In this way, the various processing units are configured by using one or more of the above various processors as the hardware structure(s).

Moreover, the hardware structures of these various processors are, for example, electric circuits (circuitries) having a form in which circuit elements, such as semiconductor elements, are combined together.

EXPLANATION OF REFERENCES

10: endoscope system
12: light source device
13a: endoscope
13b: endoscope
14: processor device
18: monitor
19: console
20: light source unit
22: light source control unit
30a: illumination optical system
30b: imaging optical system
41: light guide
45: illumination lens
46: objective lens
48: image sensor
49a: correction coefficient storage unit
49b: correction coefficient storage unit
52: central control unit
54: image acquisition unit
56: correction coefficient acquisition unit
61: image processing unit
63: white balance control unit
63a: correction coefficient storage unit
63b: range setting unit
63c: conversion coefficient storage unit
66: display control unit

What is claimed is:

1. A processor device to which an endoscope that stores a correction coefficient for correcting a white balance of color images obtained by imaging an observation object is connected and which corrects the white balance on the color images acquired from the endoscope, the processor device comprising:
   a processor, configured to:
   acquire the correction coefficient from the endoscope;
   in a case where the endoscope and the processor device are compatible, select and execute first white balance processing in which the acquired correction coefficient that is the correction coefficient is referred to and the white balance is corrected using the acquired correction coefficient; and
   in a case where the endoscope and the processor device are not compatible and the acquired correction coefficient falls within a first setting range that allows the correction of the white balance with the first conversation coefficient, select and execute second white balance processing in which the white balance is corrected using a first multiplied correction coefficient obtained by multiplying the acquired correction coefficient by a preset first conversion coefficient is selected and executed.

2. The processor device according to claim 1,
wherein the processor
executes calibration processing in which a second conversion coefficient different from the first conversion coefficient is newly calculated and executes third white balance processing in which the white balance is corrected using a second multiplied correction coefficient obtained by multiplying the acquired correction coefficient by the second conversion coefficient, in a case where the endoscope and the processor device are not compatible and the acquired correction coefficient does not fall within the first setting range that allows the correction of the white balance with the first conversion coefficient.

3. The processor device according to claim 2,
wherein, in the calibration processing, the second conversion coefficient is calculated on the basis of a white image obtained by imaging a standard white plate with the endoscope.

4. The processor device according to claim 3,
wherein, in the calibration processing, a ratio of a white image correcting coefficient calculated as the correction coefficient from the white image and the acquired correction coefficient is calculated as the second conversion coefficient.

5. The processor device according to claim 2, further comprising a memory, wherein:
the processor sets a second setting range that allows the correction of the white balance using the second conversion coefficient;
the memory stores the second setting range and the second conversion coefficient in association with each other; and
the processor executes the third white balance processing in a case where the endoscope and the processor are not compatible and the acquired correction coefficient falls within the second setting range.

6. The processor device according to claim 1,
wherein the color images are an R image, a G image, and a B image, and the correction coefficient is two gain coefficients among an R gain coefficient, a G gain coefficient, and a B gain coefficient by which the R image, the G image, and the B image are multiplied, respectively.

7. The processor device according to claim 6,
wherein the first setting range is a range that is determined from two gain coefficients among the R gain coefficient, the G gain coefficient, and the B gain coefficient.

8. A method of operating a processor device to which an endoscope that stores a correction coefficient for correcting a white balance of color images obtained by imaging an observation object is connected and which corrects the white balance on the color images acquired from the endoscope, the method comprising:
acquiring the correction coefficient;
in a case where the endoscope and the processor device are compatible, selecting and executing first white balance processing in which the acquired correction coefficient that is the correction coefficient is referred to and the white balance is corrected using the acquired correction coefficient; and
in a case where the endoscope and the processor device are not compatible and the acquired correction coefficient falls within a first setting range that allows the correction of the white balance with the first conversion coefficient, selecting and executing second white balance processing in which the white balance is corrected using a first multiplied correction coefficient obtained by multiplying the acquired correction coefficient by a preset first conversion coefficient.

* * * * *